2,719,164

MODIFICATION OF DRYING OILS

Herman S. Bloch, Chicago, Ill., assignor to Universal Oil Products Company, Chicago, Ill., a corporation of Delaware No Drawing. Original application February 18, 1948, Serial No. 9,332, now Patent No. 2,611,788, dated September 23, 1952. Divided and this application August 20, 1952, Serial No. 305,519

5 Claims. (Cl. 260—407)

This application is a division of my copending application Serial Number 9,332, filed February 18, 1948, now Patent No. 2,611,788, September 23, 1952.

This invention relates to a process for modifying the physical properties and certain other characteristic qualities of unsaturated drying oils selected from either the fatty acid ester or synthetic hydrocarbon drying oils, especially those containing conjugated olefinic unsaturation. More specifically, the invention concerns a method of altering the molecular structure and simultaneously, the physical and drying properties of unsaturated drying oils by chemically condensing the drying oil with an olefinic hydrocarbon reactant which thereby reduces the number of olefinic double bonds present in the drying oil reactant.

One of the beneficial results obtainable by the application of the present treatment to drying oils of either the unsaturated fatty acid ester or the unsaturated synthetic hydrocarbon types is the reduction of the total unsaturation of said oils, particularly of their conjugated unsaturation. The present treatment is believed to introduce such changes in the molecular structure of the drying oil that the ability of the oil to undergo polymerization and oxidation on exposure to atmospheric oxygen is affected to some extent, although not removed entirely. Observation has shown that in those instances in which the unmodified or raw drying oil on exposure in thin films to atmospheric oxygen forms a hard brittle layer of dried oil which easily checks and has little abrasion resistance, as in the case of hydrocarbon drying oils, modification of the oil by means of the present process forms a product which when exposed in thin films to atmospheric oxygen, forms a harder, tougher protective coating and provides a highly desirable component in the formulation of paints, varnishes and other protective coating compositions. In the treatment, therefore, the drying oil loses its original undesirable characteristics associated with its highly unsaturated character and low molecular weight to form a modified drying oil having its film-forming properties and its quality in relation to its use in protective coatings thereby enhanced.

Other objects and advantages obtained by the application of the present process will be hereinafter described with reference to the particular drying oil charging stocks amenable to the present treatment.

In accordance with one of its embodiments, the present invention comprises a process for modifying a synthetic hydrocarbon drying oil comprising a mixture of hydrocarbon conjunct polymers containing polyolefinic, cyclic hydrocarbons having conjugated as well as non-conjugated unsaturation recovered from a catalyst-hydrocarbon sludge formed in a conjunct polymerization reaction wherein said hydrocarbon drying oil is reacted with an olefinic hydrocarbon at condensation reaction conditions until the desired degree of alteration of the drying oil is effected as evidenced by the reduction of its maleic anhydride value.

Another embodiment of the present invention relates to a process for modifying the drying properties of tung oil which in its unmodified state dries on exposure to atmospheric oxygen at a rapid rate resulting in a dried film having a cloudy or "frosted" appearance, said process comprising reacting said tung oil with ethylene at a superatmospheric pressure and at a temperature of from about 50° to about 300° C. to thereby reduce the number of conjugated olefinic double bonds present in the fatty acid esters comprising said drying oil and to increase the molecular weight thereof accordingly.

It has been recognized and applied in the production of protective coating materials that bodying the drying oil by the application of heat thereto effects a desired change in the drying properties of the oil for protective and decorative coating purposes. In the bodying reaction, the unsaturated drying oil supposedly undergoes a type of polymerization involving the unsaturated olefinic linkages present in the drying oil and results in a reduction of the total unsaturation of the oil and provides a product having a greater viscosity and better drying qualities. Although the present process may be operated entirely on a thermal basis in which the drying oil or mixture of drying oils may be heated to initiate the reaction and thus promote a partial heat-bodying reaction, it is believed that the relatively low temperatures at which the present reaction has been observed to proceed (as low as approximately 50° C.) would preclude any extensive polymerization of the drying oil component present in the reaction mixture. Rather, the reaction mechanism involved in the present process is considered to be a combination copolymerization and/or a condensation of the olefinic hydrocarbon reactant with the drying oil or mixture of drying oils charged into the process. The molecular weight, for example, of the modified drying oil is increased as a result of the present treatment, and perhaps the most significant changes as related to the drying properties of the oil, is that the modified oil has a lower maleic anhydride value indicating that the conjugated unsaturation has been reduced during the treatment. The observed physical effects of the conversion is a reduced drying rate of the modified oil and a displacement of the tendency of the oil to become frosted or cloudy on drying, as in the case of such rapid drying oils as tung, oiticica and dehydrated castor oil. Furthermore, the modified oils do not show the same tendency to yellow and undergo pronounced coloring effects when aged following the drying thereof, as shown by the unmodified oil, especially in the case of the fatty acid ester drying oils, noted particularly in such glycerides as isomerized linseed oil. Hydrocarbon drying oils such as those recovered from catalyst-hydrocarbon sludges formed in conjunct polymerization reactions and containing hydrocarbons having a cyclic, polyolefinic structure in which a large percentage of the olefinic double bonds are conjugated, as hereinafter more specifically characterized, are also improved by application of the present treatment thereto. The physical improvement in the latter type of drying oil or a cobodied mixture of the same with the fatty acid glyceride drying oil is indicated by the pronounced reduction in the embrittlement factor inherent in the unmodified drying oils when air-dried. In contrast, the modified drying oil under the same drying conditions forms a dried film which is tougher, more resistant to abrasion and possesses significantly greater weather resistance than the brittle films formed upon drying the raw or unmodified drying oil. The latter change in properties is especially valuable in increasing the utility of the drying oil in the formulation of paint and varnish compositions where toughness and abrasion resistance of the dried film are especially important characteristics in nearly all applications of the drying oil.

An individual drying oil or a mixture of the various types of drying oils herein specified may also be subjected to an intense modifying treatment with the olefinic reactant provided herein to convert the same into oils of the non-drying type which are useful, for example, as lubricating oil additives and as plasticizers, some of which may be vulcanized, for incorporation into resins, elastomers and the like.

The primary starting material which may be subjected to modification by means of the present process and herein specified as a drying oil includes generally the poly-unsaturated fatty acids and their esters as well as certain types of unsaturated relatively high molecular weight hydrocarbons hereinafter identified and described in greater detail. The fatty acid ester type of drying oils occurs naturally as fatty acid glycerides, although these may be modified for the purposes of the present process by replacing the glyceride ester linkage with other types of alcohols, such as ethanol, polyhydroxy glycols such as ethylene glycol, pentaerythritol, sorbitol, and the like, or alkanol amines represented for example, by the mono and poly ethanol amines. Included among the fatty acid oils utilizable in the present process are the drying and semi-drying classes containing conjugated and/or non-conjugated olefinic double bonds. Of these, tung oil, linseed oil (either raw or boiled linseed oil), dehydrated castor oil, oiticica oil, perilla oil, olive oil, poppy seed oil, coconut oil, soy bean oil, hemp seed oil, poppy seed oil, safflower oil, walnut oil, etc. are representative oils of the glyceride ester type utilizable herein. The process is of greatest utility, however, with oils which have conjugated unsaturation or which develop conjugation upon heating. The fatty acid esters contained in the above oils may be hydrolyzed and the fatty acids liberated by hydrolysis may be recovered and utilized herein. Oil-modified alkyd resins, oil-modified phenolics, or other drying-oil modified resinous materials may likewise be treated as herein described, or such oil-modified resins may be prepared from drying oils or drying-oil fatty acids previously treated by the present process.

The drying oils herein specified as the hydrocarbon type drying oils comprise hydrocarbons of unsaturated structure generally of relatively high molecular weight, above about 250, and usually of cyclic structure containing conjugated as well as non-conjugated unsaturation. Hydrocarbons of the above type having drying oil properties may be prepared in any suitable manner known to the art or may be derived from various natural sources, as in the case of certain terpene fractions. One of the preferred sources of the hydrocarbon type of drying oil which is especially suitable as the drying oil reactant in the present process, are the catalyst-hydrocarbon sludges recovered from certain hydrocarbon conversion processes utilizing catalysts capable of causing conjunct polymerization between the hydrocarbon reactants charged to the conversion process. Typical of the catalysts capable of causing conjunct polymerization reactions are the various Friedel-Crafts metal halide catalysts, such as aluminum chloride and aluminum bromide and certain members of the acid type catalysts, such as concentrated sulfuric acid, substantially anhydrous hydrogen fluoride and borontrifluoride as well as others generally known to the art. The above catalysts when contacted with a reactive, generally non-aromatic hydrocarbon, such as a mono- or polyolefin containing at least 3 carbon atoms per molecule or a branched chain paraffin at reaction conditions favorable to the formation of conjunct polymers, produce a catalyst-hydrocarbon containing sludge as a distinct reaction product of the process. Conjunct polymerization occurs in the mixture of catalysts and hydrocarbons by virtue of simultaneous polymerization, cyclization, and hydrogen transfer reactions between the hydrocarbons to form relatively saturated hydrocarbons as one reaction product and an accompanying product comprising high molecular weight cyclic compounds generally referred to in the art as conjunct polymers, containing from about 2 to about 4 double bonds per molecule in conjugated as well as non-conjugated relationship to each other. The conjunct polymers, usually having a molecular weight of from about 250 to about 450 and in some cases up to about 1000 become bound by weak chemical bonds to the conjunct polymerization catalyst to form the sludge hereinabove referred to and may be released therefrom by heating the sludge, by hydrolyzing the chemical bonds, as for example by adding the sludge to water or a dilute caustic, or they may be recovered by extraction or displacement with a solvent or a more reactive material. It is not the purpose nor is it essential here to describe in detail the methods of producing sludge or of recovering the hydrocarbon type of drying oil therefrom; but a description of the process relative to use of substantially anhydrous hydrogen fluoride as conjunct polymerization catalyst (which forms a conjunct polymer hydrocarbon product having a maximum in conjugated unsaturation as compared to other conjunct polymerization catalysts and a product which on observation possesses many of the most desirable characteristics of a drying oil) will be briefly referred to in the examples hereinafter specified. The drying oil starting material may also comprise a cobodied mixture of an unsaturated fatty acid ester and an unsaturated hydrocarbon drying oil preferably cobodied prior to the present treatment. The cobodying reaction may be effected by intimately mixing the drying oils and heating the mixture to a temperature of from about 250° to about 350° C. for a period of time generally from about 1 to about 6 hours, or until the viscosity approaches the desired value. The cobodying reaction, however, should not be continued to the point where no further unsaturation remains in the drying oils since the latter characteristics are essential to the present treatment and to the desired modification thereof. Cobodying may also be effected in the presence of certain catalytic agents such as acid-acting substances, typical of which are the mineral acids, preferably phosphoric acid, the acidic silica-alumina composites or a solid phosphoric acid catalyst formed by calcining a siliceous adsorbent such as kieselguhr impregnated with a suitable phosphoric acid. The drying oils, either individually or a cobodied mixture thereof may be steam or air blown prior to utilization in the present process to provide a drying oil containing a higher degree of unsaturation and particularly of conjugated unsaturation.

The modifying reactant herein specified as an olefinic hydrocarbon which undergoes condensation and/or copolymerization with the drying oil reactant to yield a modified drying oil is preferably a mono-olefin containing fewer than about 8 carbon atoms per molecule, although higher molecular weight olefins may also be utilized when the reaction conditions are selected to obtain the desired condensation and/or copolymerization effects between the reactants. Vinyl aromatics, such as styrene, likewise copolymerize with drying oils of the type described, but the copolymers thereby formed are different in properties from the modified drying oils herein described. Of the utilizable non-aromatic mono-olefins, including iso-olefins, such as isobutylene, cyclo-olefins, such as cyclohexene, etc., ethylene is the preferred reactant because of the relative ease with which the drying oil undergoes modification in the presence of said olefin as compared to olefinic hydrocarbons of higher molecular weight. In the presence of ethylene, for example, the reaction proceeds at comparatively low temperature conditions, whereas for the utilization of higher molecular olefins, such as pentene-1, generally more severe conditions such as higher temperatures or longer reaction times are required to obtain the optimum degree of modification.

The condensation and/or copolymerization of an unsaturated drying oil with a mono-olefin hydrocarbon to form a modified drying oil product of increased molecular weight and generally containing fewer conjugated and/or isolated unsaturated bonds is effected at temperatures of from about 50° to about 300° C., preferably at temperatures of from about 100 to about 200° C., and at pressure sufficient to maintain a liquid phase. Catalysts, such as, for example, materials of the quinone type such as hydroquinone or anthraquinone, may be introduced into the reaction mixture to initiate or accelerate the reactions involved in the present process, usually in amounts of from about 0.1 to about 2% by weight of the reaction mixture. Catalysts may be especially effective in obtaining an accelerated reaction rate in the case of certain olefins, particularly the straight chain and high molecular weight types. It is to be emphasized, however, that the reaction may be initiated in the entire absence of any recognized catalytic materials when proper reaction conditions are selected.

Another type of catalyst particularly useful in the present process is the class of catalysts referred to as peroxides, such as di-t-butyl peroxide, benzoyl peroxide and t-butyl perbenzoate. When catalysts are utilized in the reaction, the catalyst may be allowed to remain in the product if desired or the product may be washed or contacted with solvents such as water or a suitable organic solvent to extract the catalyst therefrom. When utilizing the low molecular weight olefins, for example, those containing fewer than about 5 carbon atoms per molecule, as the modifying reactant, the reaction temperature may be maintained at relatively low temperatures of from about 50° to about 140° C. and usually a catalyst is not necessary. Depending upon the degree of condensation and/or copolymerization desired, low temperatures within the above operable range may be maintained, although the extent of the reaction and the fluidity (that is the viscosity) of the resulting product may be dependent upon the reaction time, the presence or absence of a catalyst, and the reactivity of the starting materials. A drying oil, for example, containing a highly conjugated system of double bonds and/or an olefin of low molecular weight generally react more readily than compounds not so characterized. The reaction rate may be further modified by dissolving the reactants in a suitable solvent such as an aliphatic saturated hydrocarbon of preferably low molecular weight which may be readily vaporized from the product following the reaction. Typical of the latter are such low-boiling hydrocarbons as propane, butane and pentane or their corresponding halogenated analogs, such as chloroform, carbon tetrachloride, etc.

The reaction involved in the present process is usually substantially complete at reaction periods less than about 8 hours, depending upon the type of product desired and the degree of modification of the original drying oil. The reaction may be conducted at relatively low temperatures, for example below about 130° C. and in the absence of the catalyst to merely reduce the number of unsaturated bonds in the drying oil reactant to a limited degree as determined by the length of time the reaction is allowed to proceed. The product obtained under such partial conditions of reaction is a fluid reaction product which still contains a large number of the unsaturated bonds originally present in the drying oil. It dries readily on exposure to atmospheric oxygen, but the film obtained thereby from a modified hydrocarbon drying oil for example, possesses none of the characteristic embrittlement tendencies of the original drying oil selected as starting material. The drying properties of the treated oils are not much impaired if the maleic anhydride value is reduced through the present treatment by about one-fourth, whereas by such a reduction the properties of the dried films are improved, e. g. the hydrocarbon drying oil films are reduced in the brittleness, while the frosting drying oil films are of improved clarity. If desired, the initial product obtained on partial condensation of the olefin and drying oil or additional fresh drying oil charge may be further reacted with a further quantity of the mono-olefin reactant either for an extended period of reaction or in the presence of a catalyst and/or at higher temperatures to obtain a more deep-seated alteration in the properties of the drying oil. If the reaction is allowed to continue further, the drying oil may contain few, if any, conjugated unsaturated bonds or multiple double bond systems capable of conjugation. In the case of glyceride or other ester-type drying oils, the reaction with the olefin hydrocarbon may be accompanied by polymerization of the oil itself so that a noticeably more viscous product is obtained.

The process may be operated either on a continuous or batchwise basis, but preferably under such conditions that the reactants are intimately contacted during the condensation and/or copolymerization reaction. In a typical batch operation for example, the drying oil, which may be dissolved in a suitable diluent, is vigorously agitated in the presence of the olefin reactant under pressure, for example, in a stirred pressure autoclave into which the olefin, if in the gaseous state, is introduced below the surface of the normally liquid drying oil reactant. In a typical continuous method of operation, the liquid mixture of drying oil, diluent, olefin, and catalyst, if present, may be allowed to flow over suitable solid contact material, such as quartz, Berl saddles, etc. at suitable temperature and pressure conditions. The apparatus may consist of a tower or a number of towers connected in series of sufficient height to provide the desired contact period and containing the contact material distributed within the column. The tower effluent may be further recycled to effect the desired degree of modification of the drying oil.

The catalyst, if utilized in the reaction, may be removed from the product by vaporizing the same at an elevated temperature or by a washing or extraction treatment with a solvent capable of dissolving the catalyst in which the product is relatively insoluble. In many instances, especially when the amount of catalyst utilized in the reaction is small, or when an organic catalyst such as a peroxide is utilized, the latter may be simply left in the product without serious effect on its drying or other properties.

The present process is illustrated in greater detail in the following examples in which specific members of the broadly defined groups hereinabove specified are reacted in accordance with the present process to obtain a modified drying oil product. The examples, however, are not to be construed as limiting the broad scope of the invention in accordance thereto.

*Example I*

A synthetic hydrocarbon type of drying oil containing a mixture of conjunct hydrocarbon polymers was prepared by the following reaction in which an octene fraction of a copolymer (of propylene and butylene) gasoline was reacted with hydrogen fluoride to form a sludge phase and a relatively saturated hydrocarbon phase. The sludge phase was mixed with water to hydrolyze the catalyst-hydrocarbon complexes contained in the sludge and the hydrocarbons recovered as the synthetic hydrocarbon drying oil utilized as charging stock herein. The product as recovered, however, dries on exposure to atmospheric oxygen to form a film which is brittle and which has little abrasion resistance. The raw drying oil product was thereafter reacted with an olefin in accordance with the present invention to form the modified drying oil product as herein provided.

22 liters (16.5 kg.) of non-selective copolymer of Br No. 162 (polymers of mixed butylenes and propylene referred to as a polymer gasoline) consisting predominantly of mono-olefinic hydrocarbons containing from about 8 to about 12 carbon atoms per molecule was charged into an autoclave and rapidly stirred as 9.0 kg. of liquid anhydrous hydrogen fluoride was introduced into the reactor. The pressure was maintained throughout the reaction at an average value of about 205 pounds per square inch by means of compressed nitrogen. The temperature was increased to 91° C. and stirring was continued for an additional hour. The reaction mixture separated into two phases on standing: an upper saturated hydrocarbon layer (bromine number=10) and a lower acidic layer. The upper layer, after washing with aqueous caustic to remove a small amount of dissolved hydrogen fluoride, weighed 8.1 kg.

The lower acidic sludge layer weighed 16.1 kg. after removal of entrained "upper layer" by extracting the latter with liquid pentane and was a light brown mobile fluid having a density of 0.98 at 4° C. Its yield, based on the total charge, was 63 percent.

100 g. of the above hydrogen fluoride sludge was allowed to flow into a mixture of ice and water, additional ice being added as the heat of reaction melted the ice in the hydrolyzing reactor. 43.4 g. of a light-colored, sweet-smelling oil separated from the aqueous phase, a yield of 42.2% based on the original olefin charged and 43.4% based on the weight of sludge hydrolyzed. An examination of the oil indicated the following properties:

| | |
|---|---|
| Boiling range | 160° to above 400° C. |
| Density, $d_4^{20}$ | 0.863. |
| Refractive index, $n_D^{20}$ | 1.4871. |
| Color, Gardner | 12–13. |
| Molecular weight, average | 263. |
| Diene number | 85. |
| Bromine number | 195. |
| Specific dispersion | 143. |
| Percent fluorine | 0.06. |
| Double bonds/molecule (average) | 3.2. |

Although the hydrocarbon drying oil herein described was prepared from a hydrogen fluoride sludge and was recovered therefrom by an aqueous hydrolysis procedure, a somewhat similar material may be obtained from an aluminum chloride or sulfuric acid sludge, and the conjunct hydrocarbon polymers comprising said drying oil may be also recovered from the hydrogen fluoride sludge by flashing off the hydrogen fluoride.

The raw hydrocarbon drying oil as prepared above was modified in accordance with the present process by reacting the same with ethylene under pressure in a thermal type of reaction.

50 grams of the 220°–325° C. fraction of the raw hydrocarbon drying oil product (having a maleic anhydride value of 98) was charged into a rotating pressure autoclave and heated with 47 atmospheres' pressure of ethylene at a temperature of 120° C. for 4 hours.

The modified drying oil remaining in the autoclave after release of ethylene had a maleic anhydride value of 63 and boiled within the temperature range of from about 252° to about 331° C.

The product when tested as a drying oil by spreading the same in a thin film over test panels and exposing the same to air set in one day to a non-tacky film, dried completely in 6 days, and exhibited considerably less brittleness than a similar film prepared from the untreated oil fraction.

*Example II*

40 grams of the hydrocarbon drying oil product prepared as in Example I was charged into a stirred pressure autoclave together with 105 grams of butene-2. The pressure was increased to 50 atmospheres by introducing nitrogen into the reactor until the latter pressure was obtained. The contents were stirred and heated to 170° C. for 6 hours.

The product drying oil had a maleic anhydride value of 65 and dried on exposure to the atmosphere to a non-tacky, non-brittle film.

*Example III*

Dehydrated castor oil of 19 maleic anhydride value was heated in a bomb for two hours at 140° C. under 40 atmospheres (initial) of ethylene pressure. The product, after degasification, had a maleic anhydride value of 14, and dried in the absence of driers to a non-frosty film in 40 hours. The untreated oil dried in 36 hours to a frosty film.

*Example IV*

A sample of tung oil of 69 maleic anhydride value was treated as in Example III except that the temperature was maintained at 120° C. The product had a maleic anhydride value of 52, and, like the treated dehydrated castor oil, dried to a clear, non-frosty film.

I claim as my invention:

1. A process for modifying an unsaturated fatty acid compound containing conjugated olefinic unsaturation selected from the group consisting of the fatty acids and the fatty acid esters derived from a natural glyceride drying oil which comprises reacting said compound in the absence of added catalyst with an aliphatic mono-olefinic hydrocarbon containing from 2 to 4 carbon atoms at a temperature of from about 50° to about 300° C.

2. The process of claim 1, further characterized in that the olefinic hydrocarbon is ethylene.

3. The process of claim 1, further characterized in that said compound is tung oil.

4. The process of claim 1, further characterized in that said compound is dehydrated castor oil.

5. The process of claim 1, further characterized in that said compound is a fatty acid ester.

References Cited in the file of this patent

UNITED STATES PATENTS 2,574,753   Opp et al. _____ Nov. 13, 1951